UNITED STATES PATENT OFFICE.

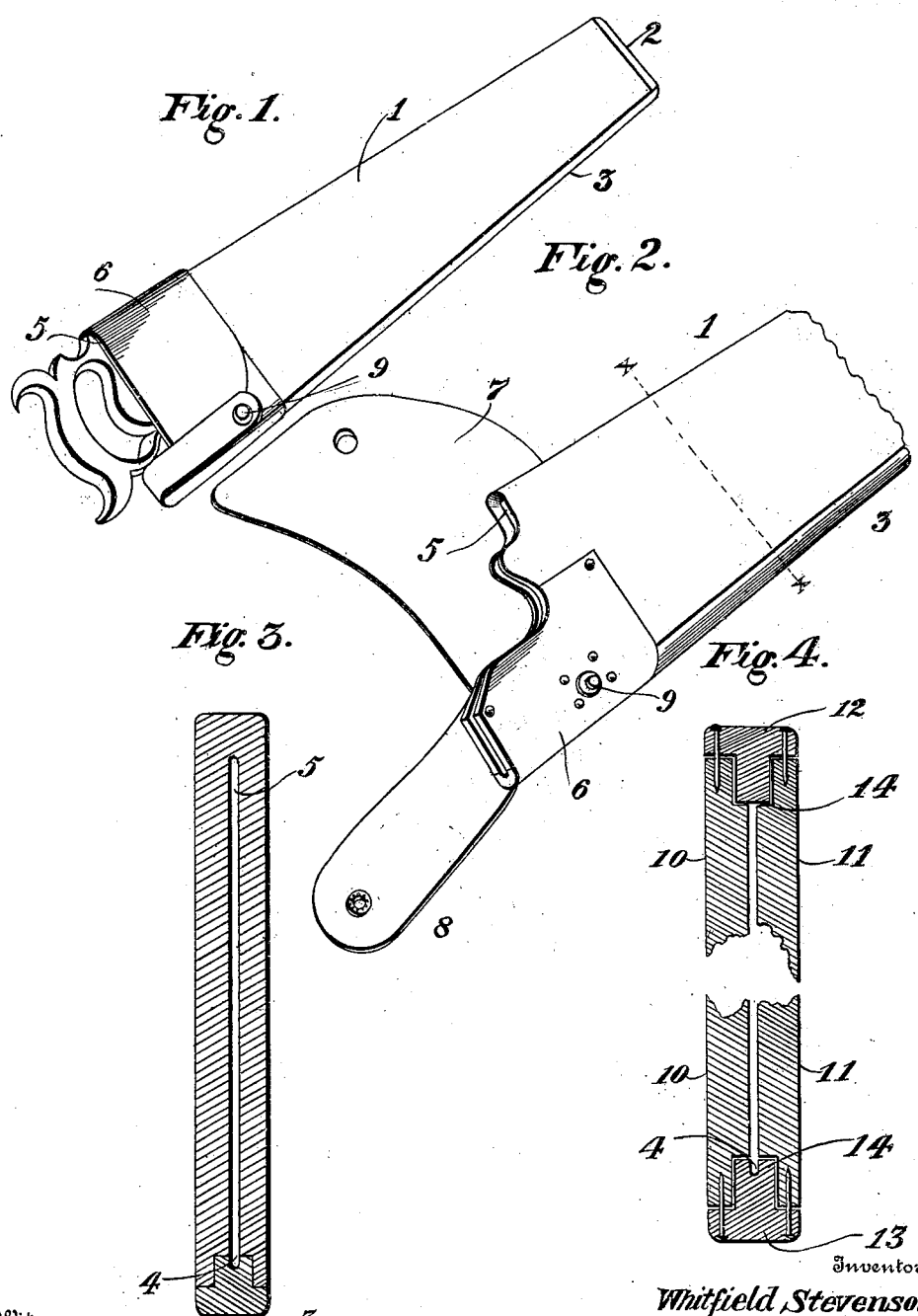

WHITFIELD STEVENSON, OF SPRINGFIELD, OHIO.

SAW-CASE.

No. 925,244.  Specification of Letters Patent.  Patented June 15, 1909.

Application filed June 25, 1908. Serial No. 440,377.

*To all whom it may concern:*

Be it known that I, WHITFIELD STEVENSON, a citizen of the United States, residing at Springfield, in the county of Clark and State of Ohio, have invented certain new and useful Improvements in Saw-Cases, of which the following is a specification.

The present invention provides a novel form of case for hand saws, such as used by carpenters, joiners and woodworkers, and known as cross-cut and rip saws.

The case is preferably constructed of wood so as to be light and cheap and is provided at its receiving end with a flexible closure in the form of flaps which are adapted to be folded over the end of the saw and inner part of the handle so as to exclude air, dampness and the like, the case being of such construction as to be supplied at a cost to insure its general adoption because of the manifold advantages resulting from its use, such as protecting the saw from dampness, from kinking, warping or buckling, and prevent dulling or injuring the teeth which happens by tools and other articles coming in contact with the tooth edge of the saw.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a case for hand saws embodying the invention. Fig. 2 is a perspective view of the receiving end of the case, the flaps of the textile closure being thrown open. Fig. 3 is a transverse section of the case on the line $x$—$x$ of Fig. 2. Fig. 4 is a sectional view similar to Fig. 3 of a modification.

Corresponding and like parts are referred to in the following description and indicated in all the views of the drawings by the same reference characters.

While wood is preferred in the construction of the case, it is to be understood that any suitable material may be utilized. The case is of a size and shape to snugly receive the saw to be protected or sheathed thereby.

In outline, the case approximates the form of the saw and tapers throughout its length in conformity to the usual outline of the blade of a hand saw. The case is comparatively thin or flat so as to present a light and neat appearance and is closed upon all sides except at the receiving end through which the saw blade is inserted and removed. The receiving end of the case conforms to the outline of the inner end of the saw and handle so as to fit the same closely. The case is constructed with a view to inclose and protect the saw blade and is approximately of a thickness corresponding to the thickness of the saw handle.

The case may be variously formed, as shown in Figs. 1, 2 and 3, and comprises three parts, namely, body 1, an end 2, and a bottom 3. The body 1 is formed with a kerf 4, the latter to within a short distance of the back and running the entire length of the body, the kerf forming the space to receive the saw blade 5. The end and bottom pieces are strips which are secured, respectively, to the end and bottom of the body, either by being glued thereto or fastened by brads. The strip 2 closes the outer or lower end of the body, whereas the strip 3 closes the bottom of said body. The kerf 4 may be formed in any manner and is slightly widened at or near the bottom of the case to provide ample clearance for the teeth of the saw to prevent the same coming in contact with the inner walls of the kerf or space of the case.

A flexible closure is provided at the receiving end of the case and consists of a strip 6 of textile, the same having an end portion glued or otherwise fastened to the end of the case and having extensions forming flaps 7 and 8. The flap 7 extends laterally from the case and is adapted to fold over the side thereof opposite that to which the textile strip is attached so as to form a fixed wall for one side of the saw handle, said flap folding over and closing the inner portion of the opposite side of said saw handle. The flap 8 projects lengthwise of the case and is adapted to fold over the end of the saw blade below the handle, thereby preventing the withdrawal of the saw from the case and at the same time closing the end of the case below said handle so as to exclude dampness and foreign matter. A suitable fastening 9, such as a separable button, is fitted to the case and one of the flaps to secure the latter when folded. When the saw is slipped into the case and the flaps 7 and 8 folded and secured, the saw blade and the inner part of the saw handle having the fastenings, are protected as will be readily understood.

In the construction shown in Fig. 4, the case comprises side pieces 10 and 11 and longitudinal strips 12 and 13 which close the space formed between said side pieces and are firmly attached to the edge portions thereof either by being glued thereto or attached by brads or like fastenings. The longitudinal strips 12 and 13 constitute the back and bottom of the case and each has a tongue 14 upon its inner side and said tongues fit rabbets formed in the inner sides of the parts 10 and 11.

Having thus described the invention, what is claimed as new is:

1. A case for hand saws, the same consisting of a body having a space to receive the blade of the saw and having its end conforming to the inner end of the saw handle, and a flap for closing the end portion of the space at one side of the handle and adapted to extend over the end of the saw blade.

2. A case for hand saws, the same consisting of a body having a space to receive the blade of the saw, a flap adapted to encircle the end of the case and a portion of the saw handle, and a second flap adapted to close the end portion of the space at one side of the saw handle and to extend over the end of the saw blade projecting beyond said saw handle.

3. A case for hand saws, the same consisting of a body having a space to receive the blade of the saw and having the end of the case conforming to the inner end of the saw handle, a textile closure fitted to the receiving end of the case and comprising a lateral and a longitudinal flap, the lateral flap adapted to fold over the inner end of the saw handle and a portion of the case and the longitudinal flap adapted to extend over the end of the case and the end of the saw blade projecting beyond the handle, and means for securing both flaps when folded.

4. A case for hand saws comprising a body formed of spaced sides and a strip attached to and connecting the edge portions of said sides and having the projecting portion to come between the said sides, and parts at the sides of the projecting portion to lie against the outer edges of said sides.

5. A case for hand saws comprising a body having a space to receive the saw blade, a flap secured at one end to the body and adapted to fold about said body and the inner portion of the saw handle, and a second flap secured at one end to the body and adapted to extend over the space at one side of the handle and over the projecting end portion of the saw blade, and means for securing the loose ends of the flaps to the case.

In testimony whereof I affix my signature in presence of two witnesses.

WHITFIELD STEVENSON. [L. S.]

Witnesses:
NELLIE O'DONNELL,
WILLIAM P. LARIE.